(12) United States Patent
White et al.

(10) Patent No.: US 9,068,999 B2
(45) Date of Patent: Jun. 30, 2015

(54) AIRSPEED ESTIMATION USING ROTOR VIBRATIONS

(71) Applicant: Sikorsky Aircraft Corporation, Stratford, CT (US)

(72) Inventors: Matthew A. White, Milford, CT (US); Harshad S. Sane, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 277 days.

(21) Appl. No.: 13/905,784

(22) Filed: May 30, 2013

(65) Prior Publication Data

US 2014/0358333 A1    Dec. 4, 2014

(51) Int. Cl.
*G01C 23/00* (2006.01)
*G01P 5/00* (2006.01)

(52) U.S. Cl.
CPC ...................... *G01P 5/00* (2013.01)

(58) Field of Classification Search
USPC .................... 701/3, 7, 10, 13, 14
See application file for complete search history.

(56) References Cited

U.S. PATENT DOCUMENTS

| | | |
|---|---|---|
| 3,572,126 A | 3/1971 | White et al. |
| 5,874,673 A | 2/1999 | Greene |
| 7,136,794 B1 | 11/2006 | Bechhoefer |
| 2003/0045976 A1* | 3/2003 | Bechhoefer ............. 701/29 |
| 2010/0270422 A1* | 10/2010 | Karem ............. 244/17.13 |

* cited by examiner

*Primary Examiner* — Kim T Nguyen
(74) *Attorney, Agent, or Firm* — Cantor Colburn LLP

(57) ABSTRACT

Embodiments are directed to determining, by a computing device comprising a processor, at least one parameter associated with a rotorcraft, obtaining, by the computing device, a profile of a vibration associated with the operation of the rotorcraft based on the at least one parameter, determining, by the computing device, an amplitude of the vibration using the profile, and determining, by the computing device, an airspeed of the rotorcraft based on amplitude.

18 Claims, 4 Drawing Sheets ated with the operation of the rotorcraft based on the at least one parameter, determine an amplitude of the vibration using the profile, and determine an airspeed of the rotorcraft based on amplitude.

AIRSPEED ESTIMATION USING ROTOR VIBRATIONS

STATEMENT REGARDING FEDERALLY SPONSORED RESEARCH OR DEVELOPMENT

This invention was made with Government support with the United States Army under contract No. W911W6-10-2-0004. The Government has certain rights in this invention.

BACKGROUND

In an aerospace application or environment, it may be desirable to schedule flight control parameters in connection with airspeed. In connection with rotorcraft, rotor downwash may cause most airspeed sensors to provide unreliable data, particularly at low speeds.

BRIEF SUMMARY

An embodiment is directed to a method comprising: determining, by a computing device comprising a processor, at least one parameter associated with a rotorcraft, obtaining, by the computing device, a profile of a vibration associated with the operation of the rotorcraft based on the at least one parameter, determining, by the computing device, an amplitude of the vibration using the profile, and determining, by the computing device, an airspeed of the rotorcraft based on amplitude.

An embodiment is directed to an apparatus comprising: at least one processor, and memory having instructions stored thereon that, when executed by the at least one processor, cause the apparatus to: determine at least one parameter associated with a rotorcraft, obtain a profile of a vibration associated with the operation of the rotorcraft based on the at least one parameter, determine an amplitude of the vibration using the profile, and determine an airspeed of the rotorcraft based on amplitude.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
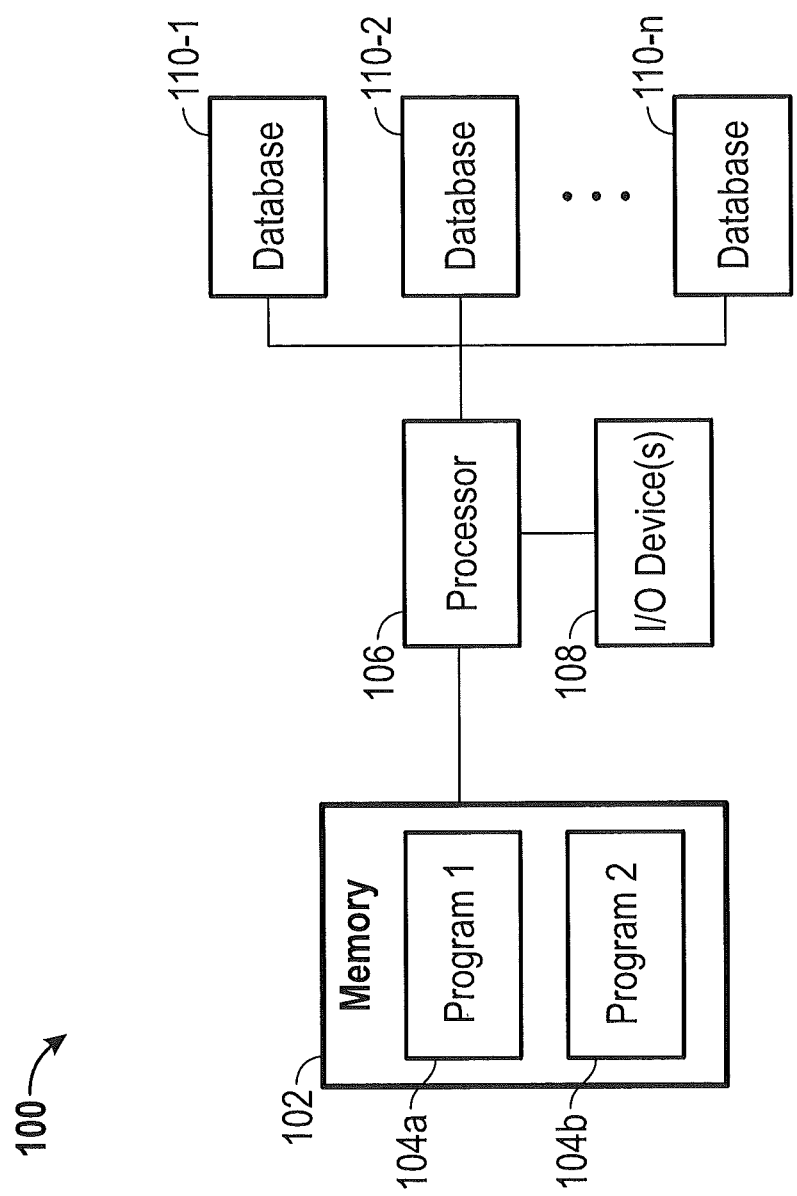
FIG. 1 is a schematic block diagram illustrating an exemplary computing system.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for determining an airspeed associated with an aircraft, such as a rotorcraft. In some embodiments, the airspeed may be synthesized from other known parameters, such as the number of rotor blades and a rotor rotational speed. In some embodiments, the airspeed may be determined based on a parameter (e.g., an amplitude) associated with a vibration. In some embodiments, information or parameters (e.g., an amplitude of vibration) may be provided via a health and usage monitoring system (HUMS), an active vibration system (AVS), an inertial measurement unit (IMU), and/or an embedded GPS/inertial navigation system (EGI).

Referring to FIG. 1, an exemplary computing system 100 is shown. The system 100 is shown as including a memory 102. The memory 102 may store executable instructions in programs 104a and 104b. The executable instructions may be stored or organized in any manner and at any level of abstraction, such as in connection with one or more applications, processes, routines, procedures, methods, etc. As an example, at least a portion of the instructions are shown in FIG. 1 as being associated with a first program 104a and a second program 104b. The memory 102 can be removable media and/or can be external to the system 100 and connected using one or more networks.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a joystick, a printer, a telephone or mobile device (e.g., a smartphone), etc. The I/O device(s) 108 may be configured to provide an interface to allow a user to interact with the system 100. The I/O device(s) 108 can be directly connected to the system 100 or connectable to the processor 106 using wired and/or wireless protocols.

As shown, the processor 106 may be coupled to a number 'n' of databases, 110-1, 110-2, ... 110-n directly or across a network. The databases 110 may be used to store data. In some embodiments, the data may include one or more parameters associated with the operation of an aircraft (e.g., a rotorcraft). For example, the data may include a number of rotor blades, a rotor rotational speed, and an amplitude of vibration. The processor 106 may be operative on the data stored in at least one of the databases 110-1 through 110-n to calculate airspeed.

The system 100 is illustrative. In some embodiments, one or more of the entities may be optional. In some embodiments, additional entities not shown may be included. In some embodiments, the entities may be arranged or organized in a manner different from what is shown in FIG. 1. For example, in some embodiments, the memory 102 may be coupled to or combined with one or more of the databases 110-1 through 110-n.

Figure 2:
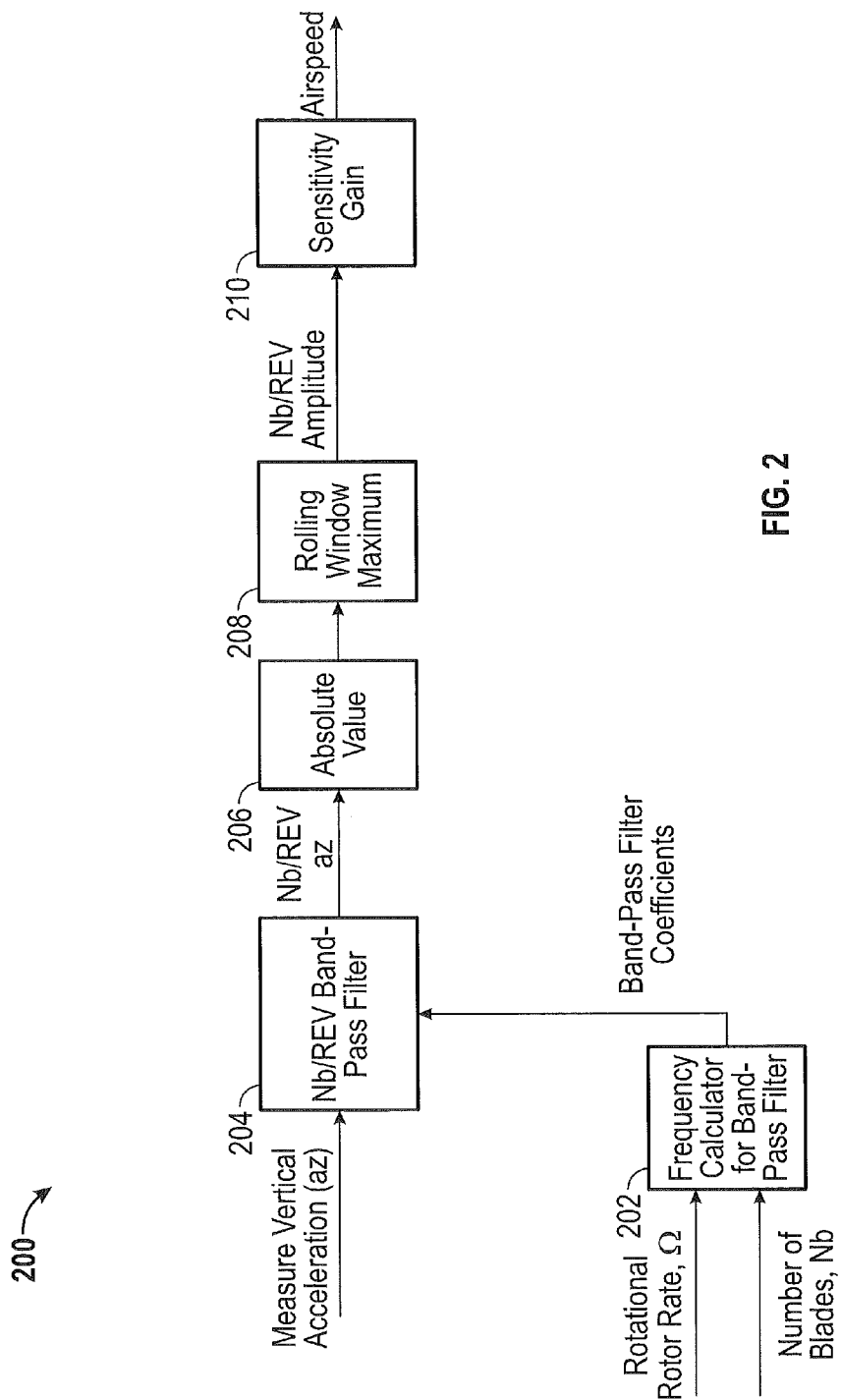
FIG. 2 is a block diagram of a system environment.
Figure 4:
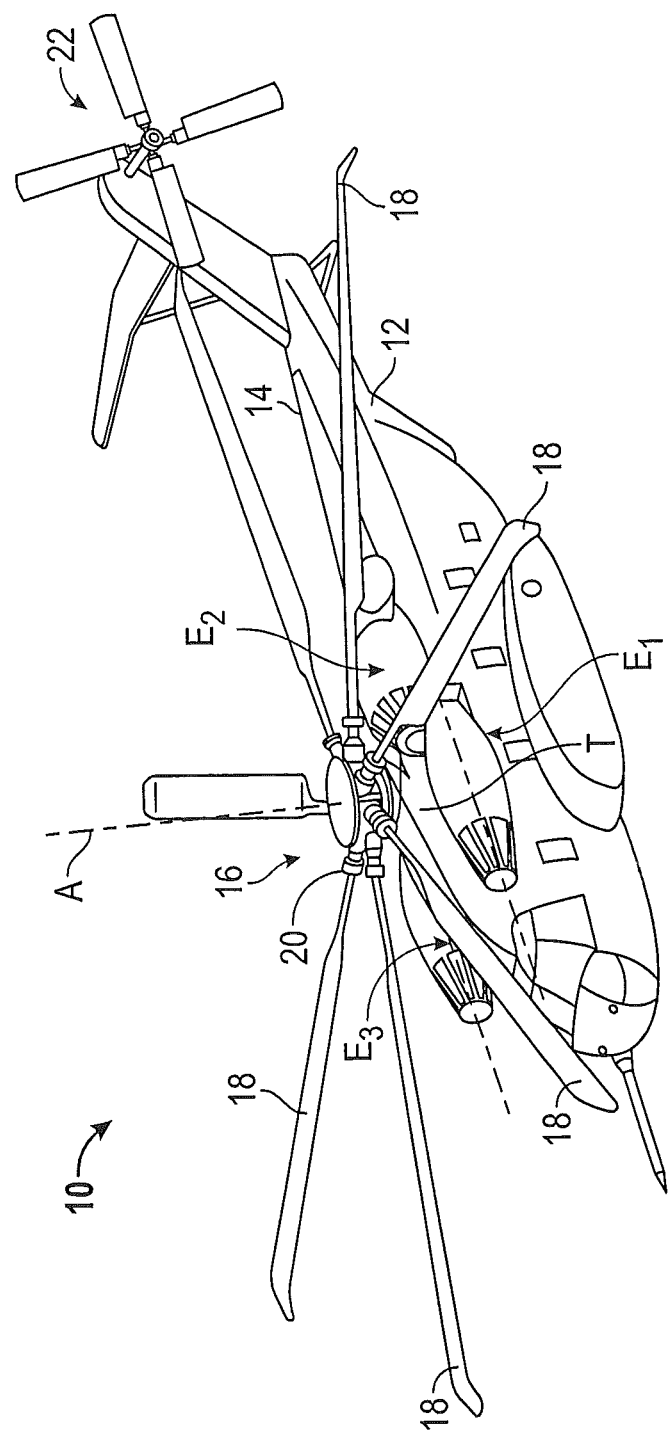
FIG. 4 illustrates a rotorcraft using the exemplary computing system.

Turning now to FIG. 2, a system environment 200 in accordance with one or more embodiments is shown. The system 200 may be implemented in connection with one or more components or devices, such as those described above in connection with the system 100. The system 200 may be used to calculate or determine an airspeed for an aircraft, such as a rotorcraft as shown in FIG. 4.

Block 202 may be configured as a frequency calculator for a band-pass filter 204. The frequency calculator 202 may generate one or more filter coefficients based on one or more inputs, such a rotational rotor rate ($\Omega$) and a number of blades (Nb).

The band-pass filter coefficients output by the frequency calculator 202 may serve as an input to the band-pass filter 204. A measurement of vertical acceleration (az) may serve as an input to the band-pass filter 204. 'az' may correspond to a variable that may be used to represent acceleration in a vertical (e.g., 'Z') axis relative to a fuselage frame or body frame. The acceleration may be measured by one or more sensors, such as Inertial Measurement Units (IMUS), Inertial Navigation Units (INUs), Hub-Mounted Vibration Systems (HMVS), Embedded GPS/INS (EGIs), etc.

The output of the band-pass filter 204 may correspond to the vibration or oscillation experienced by the aircraft and may be based on a recognition that the total lift for the aircraft may oscillate at a frequency that is based on (e.g., is proportional to) the product of the number of blades (Nb) and the rotational rate ($\Omega$).

The output of the band-pass filter 204 may be subjected to an absolute value algorithm 206 in order to disregard directional properties, and a rolling window maximum algorithm 208 to provide the amplitude of the vibration. The amplitude of the vibration may be proportional to the airspeed.

The rolling window algorithm 208 may be associated with an array that may contain the most recent 'n' measurements. For each measurement sample, the most recent measurement may be added to the array, and the oldest measurement contained in the array may be removed. The array may be stored in memory.

A sensitivity gain algorithm 210 may be applied to the amplitude of the vibration/oscillation to generate or determine the airspeed, potentially based on an application of one or more gain factors. The gain factors may be determined for a particular model of an aircraft, potentially based on simulation and/or experimental corroboration of simulation results.

In some embodiments, an AVS may attenuate the amplitude of the vibration. In such embodiments, the algorithm 210 may be tuned to respond to an AVS control input in, e.g., the Z-direction, which may be indicative of the actual vibration being canceled.

Figure 3:
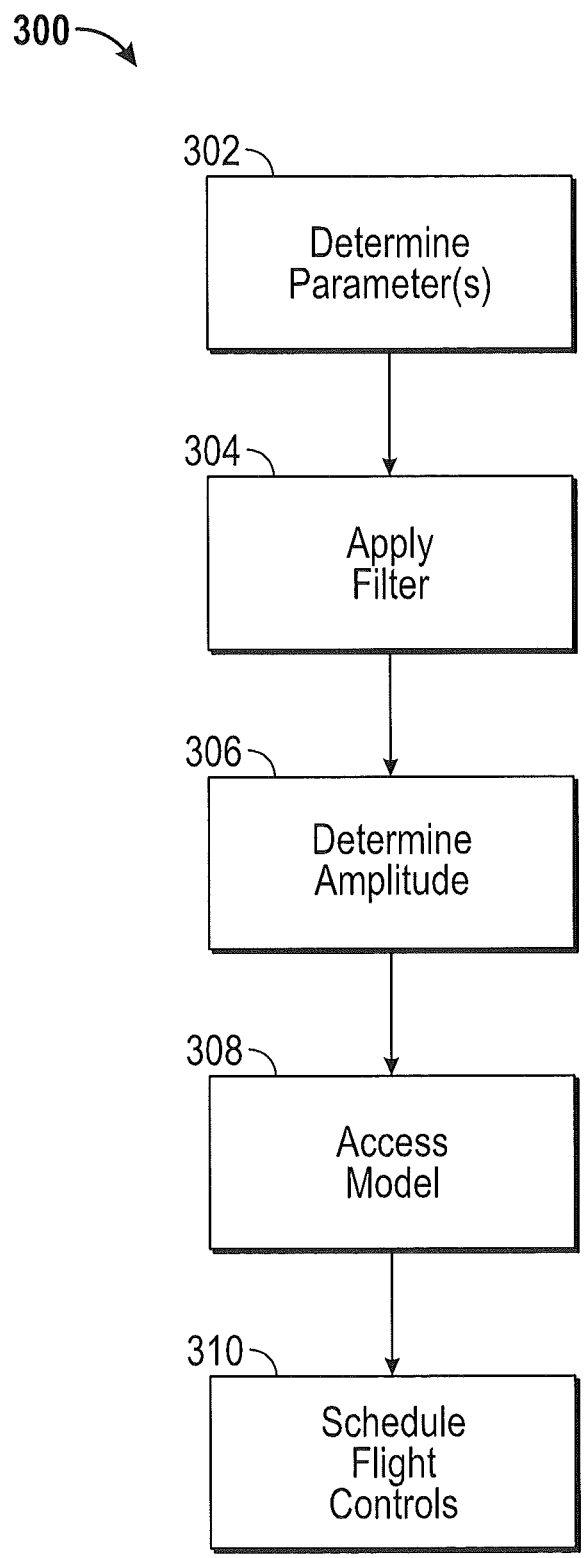
FIG. 3 illustrates a flow chart of an exemplary method.

Turning now to FIG. 3, a flow chart of an exemplary method 300 is shown. The method 300 may be executed by one or more systems, components, or devices, such as those described herein (e.g., the system 100 and/or the system 200). The method 300 may be used to compute an airspeed for an aircraft based on one or more parameters.

In block 302, one or more parameters may be determined for an aircraft. For example, a measured vertical acceleration (az), a rotor rotational rate ($\Omega$), and a number of blades (Nb) may be determined or measured as part of block 302. The vertical acceleration (az) may be detected from one or more sensors located on the rotor hub or redundantly placed in multiple locations on the fuselage and the rotor rotational rate $\Omega$ may be detected from rotor rotational speed sensor. The number of rotors and/or blades Nb may be input by a user or stored, where the number will not vary.

In block 304, a filter may be applied to one or more of the parameters of block 302. The output of the filter may correspond to a profile for an oscillation or vibration of a rotor system, the frequency of which may be proportional to a total lift.

In block 306, a determination of the amplitude of the vibration or oscillation may be made. In some embodiments, the determination of block 306 may be made based on a Fourier transform or analysis on the oscillation profile obtained in block 304. As part of block 304 and/or block 306, data from a measured vibration signal may be accessed and analyzed.

In block 308, a model of the variation of the amplitude with airspeed may be accessed to determine an airspeed associated with (e.g., correlated to) the amplitude of block 306. As part of block 308, one or more gain factors may be applied. Modeling errors may be tolerated in some embodiments. For example, an estimate of the airspeed within +/−10 knots may be sufficient in some embodiments.

In block 310, one or more flight controls may be scheduled or determined based on the airspeed determined in block 308.

The method 300 is illustrative. In some embodiments, one or more of the blocks or operations (or a portion thereof) may be optional. In some embodiments, additional operations not shown may be included. In some embodiments, the operations may execute in an order or sequence different from what is shown in FIG. 3.

FIG. 4 schematically illustrates a rotary-wing aircraft 10 including a fuselage 12 having an extended tail 14. A main rotor assembly 16 is mounted on the top of the airframe. The main rotor assembly 16 is driven about an axis of rotation A through a main gearbox by one or more engines E. The main rotor assembly 16 connects blades 18 to a rotor hub 20.

The aircraft 10 may include a rotoprop 22. The rotoprop 22 is shown in a tail rotor position. The rotoprop 22 may be mounted on a swivel to be controllably moved to a propeller position.

Although a particular helicopter configuration is illustrated and described in the disclosed non-limiting embodiment of FIG. 4, other configurations and/or machines, such as high speed compound rotary wing aircraft with supplemental translational thrust systems, dual contra-rotating coaxial rotor system aircraft, turboprops, tilt-rotors, and tilt-wing aircraft may be used.

Embodiments of the disclosure may be tied to one or more particular machines. For example, one or more devices, apparatuses, systems, or architectures may be configured to determine airspeed based on one or more parameters, such as a measured vertical acceleration (az), a rotor rotational rate ($\Omega$), and a number of blades (Nb). The determined airspeed may serve as a replacement for conventional airspeed sensors or may be used to provide for (differentiated) redundancy regarding the airspeed.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional. Moreover, while described in the context of rotorcraft, aspects can be used in other contexts, such as wind turbines or ships.

What is claimed is:

1. A method comprising:
   determining, by a computing device comprising a processor, at least one parameter associated with a rotorcraft;
   obtaining, by the computing device, a profile of a vibration associated with operation of the rotorcraft based on the at least one parameter;
   determining, by the computing device, an amplitude of the vibration using the profile; and
   determining, by the computing device, an airspeed of the rotorcraft based on the amplitude.

2. The method of claim 1, wherein the at least one parameter comprises at least one of: a rotational rotor rate, a number of rotor blades, and a measured vertical acceleration of the rotorcraft.

3. The method of claim 1, wherein the obtaining of the profile comprises:
   applying, by the computing device, a band-pass filter to the at least one parameter to obtain the profile of the vibration.

4. The method of claim 1, wherein the determining the amplitude comprises:
   applying, by the computing device, an absolute value algorithm and a rolling window maximum algorithm to the obtained profile of the vibration to obtain the amplitude.

5. The method of claim 1, further comprising:
   applying, by the computing device, a Fourier transform to the obtained profile of the vibration to obtain the amplitude.

6. The method of claim 1, wherein the determining the airspeed comprises:
   applying, by the computing device, at least one gain factor to the determined amplitude to determine the airspeed.

7. The method of claim 6, wherein the at least one gain factor is determined for the rotorcraft based on experimental corroboration of computer simulation results.

8. The method of claim 1, further comprising:
   scheduling, by the computing device, at least one flight control based on the determined airspeed.

9. An apparatus comprising:
   at least one processor; and
   memory having instructions stored thereon that, when executed by the at least one processor, cause the apparatus to:
      determine at least one parameter associated with a rotorcraft;
      obtain a profile of a vibration associated with operation of the rotorcraft based on the at least one parameter;
      determine an amplitude of the vibration using the profile; and
      determine an airspeed of the rotorcraft based on the amplitude.

10. The apparatus of claim 9, wherein the at least one parameter comprises a rotational rotor rate, a number of rotor blades, and a measured vertical acceleration of the rotorcraft.

11. The apparatus of claim 10, wherein the instructions, when executed by the at least one processor, cause the apparatus to:
    compute filter coefficients based on the rotational rotor rate and the number of rotor blades, and
    apply a band-pass filter to the measured vertical acceleration based on the filter coefficients to obtain the profile of the vibration.

12. The apparatus of claim 9, wherein the instructions, when executed by the at least one processor, cause the apparatus to:
    apply an absolute value algorithm and a rolling window maximum algorithm to the profile of the vibration to obtain the amplitude.

13. The apparatus of claim 9, wherein the instructions, when executed by the at least one processor, cause the apparatus to:
    apply a Fourier transform to the profile of the vibration to obtain the amplitude.

14. The apparatus of claim 9, wherein the instructions, when executed by the at least one processor, cause the apparatus to:
    apply at least one gain factor to the amplitude to determine the airspeed.

15. The apparatus of claim 14, wherein the at least one gain factor is determined for the rotorcraft based on experimental corroboration of computer simulation results for the rotorcraft.

16. The apparatus of claim 9, wherein the instructions, when executed by the at least one processor, cause the apparatus to:
    schedule at least one flight control based on the airspeed.

17. The apparatus of claim 9, wherein the apparatus is implemented on the rotorcraft in place of a sensor configured to determine the airspeed of the rotorcraft.

18. The apparatus of claim 9, wherein the apparatus is implemented on the rotorcraft, and wherein the rotorcraft includes a sensor configured to determine the airspeed of the rotorcraft.

* * * * *